July 16, 1968

D. G. STEVENSON 3,393,055

PRECIPITATION PROCESSES

Filed Oct. 5, 1964

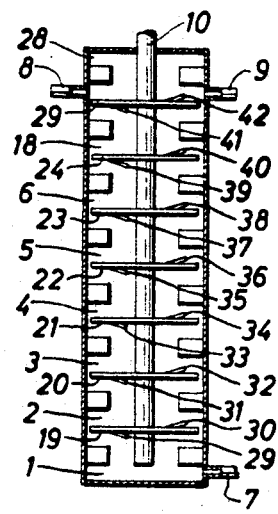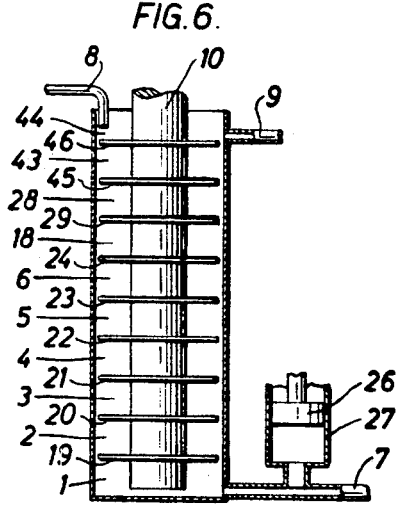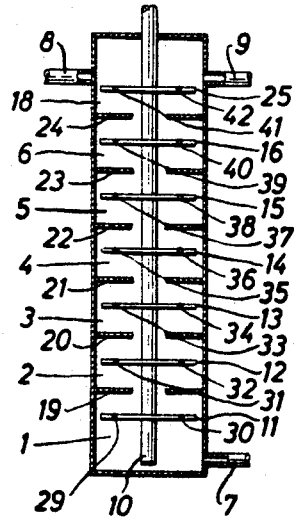

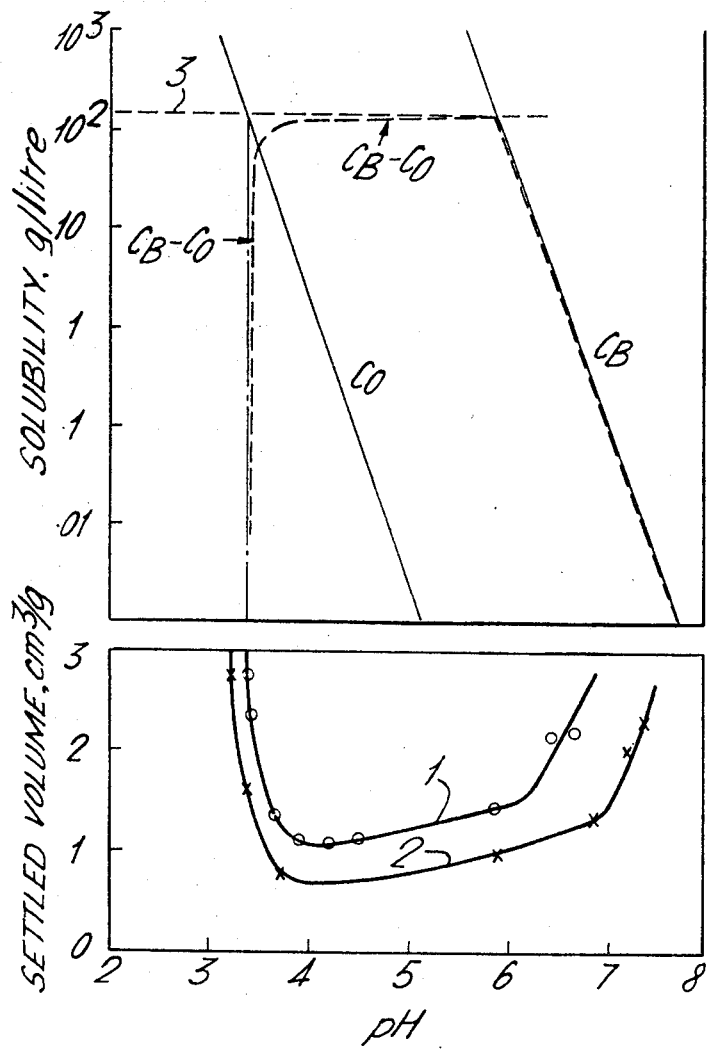

United States Patent Office 3,393,055
Patented July 16, 1968

3,393,055
PRECIPITATION PROCESSES
David Gordon Stevenson, Kempshott, Basingstoke, England, assignor to United Kingdom Atomic Energy Authority, London, England
Filed Oct. 5, 1964, Ser. No. 401,574
Claims priority, application Great Britain, Oct. 10, 1963, 39,996/63
11 Claims. (Cl. 23—335)

ABSTRACT OF THE DISCLOSURE

Multistage precipitation process wherein an excess of a miscible precipitant material is fed into a moving fluid stream consisting initially of a feed material dispersed in a fluid medium and not physically separable therefrom, sweeping the precipitant material along in said stream and simultaneously dispersing it therein to form a fluid mix, in which the feed material is converted to precipitate physically separable from the fluid medium. A proportion of the fluid mix in each of a plurality of consecutive interconnected mixing stages is simultaneously transferred to a point up stream of the fluid mix and dispersed in the moving stream and the dispersed mix is swept along in the fluid stream.

Background of the invention

This invention relates to precipitation processes of the type in which a feed material disposed in a fluid medium in a form in which it is not physically separable therefrom is converted by a precipitant material into a precipitate which can be physically separated from the fluid medium.

Such precipitation processes can be considered to fall into two main classes. One class consists of those chemical processes in which the chemical nature of the feed material is changed, for example as in the conversion of uranyl nitrate to ammonium di-uranate in processes for obtaining uranium from its solutions. The other class consists of those processes in which the physical environment is changed by an added material, for example as in the separation of an organic material from a solvent by the admixture of a material miscible therewith which lowers the solvent power, or even lowers the temperature, of the solvent and thereby throws the organic material out of solution as a crystalline precipitate.

As is well known the physical nature of the precipitate is influenced very markedly by the variables in the precipitation process itself. It is possible to produce from the same material a precipitate in a gelatinous form, a curdy form, a finely crystalline form or a coarsely crystalline form merely by changing the rate and method of mixing of the materials. This particularly apparent in the case where the precipitate is a consequence of adding a reagent A to a reagent B. Thus reagent A could be added to reagent B, or reagent B could be added to reagent A, or both could be run simultaneously into the same vessel, and the physical form of the precipitate will be different in each case.

As far as ease of separation, for example by settling and/or filtration is concerned, coarsely crystalline precipitates are preferred. Unfortunately, the conditions which lead to the formation of such coarsely crystalline precipitates normally necessitate the use of conditions giving an appreciable solubility and consequently lead to the retetion of undesirable large quantities of the feed material in solution in the fluid medium. The formation of a coarse crystalline precipitate calls for very little excess precipitant and a low rate of nucleation and these conditions are incompatible with complete precipitation. For example, ammonium di-uranate can be precipitated by adding ammonia to an aqueous solution of uranyl nitrate in a well stirred vessel at pH 4 to give a rapid settling, easily filtered precipitate of ammonium di-uranate, but more than 1 percent of the uranium remains in the solution and passes through the filters. It is, of course known, in such cases, to pass the mother liquor to a second stage where more ammonia can be added to bring the pH to pH 7 to precipitate most of the remaining uranium as ammonium di-uranate in a difficultly filterable state. Further stages could be used if desired. Such multistage processes are capable of giving a good yield of solid product, most of which is easily filterable. The small quantity of badly filterable product does not have a very adverse effect on the filtration stage.

The multistage processes used up to now, however, suffer from certain disadvantages which are:

(a) a plurality of flow rates of precipitant have to be controlled,
(b) a region of high concentration of precipitant material occurs at each point of entry of this material into the fluid medium,
(c) each point of entry is liable to blockage if the feed material forms a colloidal or very fine precipitate with high concentrations of precipitant material.

An object of this invention is to provide a multistage precipitation process which does not suffer from the above disadvantages.

Another object of the invention is to provide a multistage precipitation process which can operate with only a single point of entry of precipitant material.

Another object of the invention is to provide a multistage precipitation process which can produce an easily separable precipitate in high yield.

The invention consists in a multistage precipitation process which comprises feeding an excess of a precipitant material into a moving fluid stream consisting initially of a feed material dispersed in a fluid medium, the said precipitant material being miscible with the said fluid medium, and the said feed material being present in a form in which it is not physically separable from the fluid medium, sweeping the precipitant material along in the said stream and simultaneously dispersing it therein to form a fluid mix in which the feed material is converted into a precipitate which is physically separable from the fluid medium, transferring a proportion of the said fluid mix to a point upstream of the said mix, dispersing the said mix in the said moving stream, and sweeping the dispersed mix along in the said stream.

It can be seen that the process is essentially a process involving a state of dynamic equilibrium. One way of visualising this equilibrium is to consider that on to the forward flow of feed material, there is impressed a reverse flow of precipitant material by the operation of the transference and subsequent dispersion of the fluid mix. Since an excess of precipitant material is fed into the moving stream, complete precipitation of feed material is ensured, and the fluid mix must contain some unused precipitant material in addition to precipitate. The precipitate provides nuclei for the growth of discrete precipitate particles. Fresh feed material dispersed in the fluid medium is thus mixed with a relatively small number of nuclei upon which deposition can occur and with diluted precipitant material before it can come into contact with fresh precipitant material.

The transference can be carried out at any desired number of points in sequence as required for the particular reaction or crystallisation which it is desired to carry out.

Only one entry point for precipitant material is required and this entry point can be, and preferably is, down stream of the region where precipitation is completed in the moving stream. Thus blockage of the entry point by the formation of precipitate is not possible. Local high concentrations of precipitant material are prevented and the precipitant material is progressively diluted as it moves upstream.

Flow rates and transference rates can be ascertained by calculation or by routine observation to cover the operating concentration ranges required in any specific instance. In the invention the transference rates can be adjusted to give the optimum residence time for the particle sizes required.

The transference is preferably achieved by periodically reversing the flow of the moving stream. The transference can also be achieved by the creation of vortices or swirls in the moving stream.

The longer the mean residence time of feed material in the process, the larger the particle size of the precipitate becomes.

The feed material may be an inorganic ionic material. This is probably the commonest material for use in the operation of the invention, and it is preferred that it should be adapted to produce a precipitate by chemical reaction with the precipitant material.

The precipitant material may be chemically inert e.g. a liquid or other substance for modifying the solvent power of the fluid medium, or it may be a reagent e.g. a solution of an ionic species, which takes part in a chemical reaction.

The fluid medium is preferably a liquid. It may be an inert solvent e.g. a paraffin, or it may itself take part in the chemical reaction. Thus for example it may be an aqueous solution of ammonia or of a mineral acid as determined by the requirements of the process itself, and it may be the precipitant material or the feed material if either of these is fluid.

It is clear that the inter-relation of the feed material, the precipitant material and the fluid material is determined by the chemical requirements of the process, and by the requirement that the fluid medium and the precipitant material must be miscible.

The direction of movement of the stream may be horizontal or vertical or inclined. A substantially vertical movement is preferred since it assists the control of the residence time of the precipitate in the fluid medium.

The rates can be adjusted to give appreciable back settling of the precipitate if desired, thereby increasing the residence time.

Since the system takes some time to reach equilibrium, it is advantageous to leave some of the fluid medium and materials in the apparatus after shut-down. When the process is begun again, the fresh materials are fed into the old residues.

The invention will be better understood by reference to the accompanying drawings in which FIGURE 1 is a diagram to illustrate the theory behind the invention, FIGURE 2 shows a vertical flow line in which liquid transference is achieved by reciprocation of a rotating rod and the zones are defined by the walls of chambers.

FIGURE 5 shows a vertical flow line in which liquid transference is achieved by the action of rotating discs having scoops and the zones are defined by the discs.

FIGURE 6 shows a vertical flow line in which liquid transference is achieved by a piston reciprocating in an arm to one feed line and the uniform distribution is achieved by toroidal circulation.

FIGURE 7 shows a vertical flow line in which liquid transference is achieved by a non-rotating reciprocating rod, and FIGURE 8 is a graph showing the connection between settled volume of annomium di-uranate precipitate and the pH at which precipitation was carried out.

Figure 1:
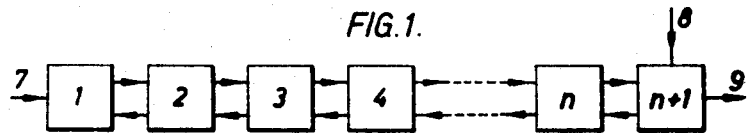

In FIGURE 1 there are $n+1$ zones. Feed material enters zone 1 at 7, precipitant material enters zone $n+1$ at 8 and precipitate is withdrawn at 9 from zone $n+1$.

Let the total quantity of precipitated and unprecipitated precipitant material in any zone $m$ be $C_m$.

The volumnar feed rate of feed material into zone 1, and therefore into all zones, is $x$.

The volumnar rate of flow of fluid medium from zone $m$ to zone $(m-1)$ is $y_{m-1}$.

Considering zone 1:

Total in.—$x$ of feed material, $y_1$ of fluid medium containing a concentration $C_2$ of precipitant material.

Totale out.—$x$ of feed material, $y_1$ of fluid medium containing a concentration $C_1$ of precipitant material where $$C_1 = C_2 \frac{y_1}{x+y_1}$$

Considering zone 2: All that flows from zone 2 to zone 1 must return so its net change is zero.

Total in.—$x$ of feed material, $y_2$ with concentration $C_3$
Total out.—$x$ of feed material, $y_2$ with concentration $C_2$ where $$C_2 = C_3 \frac{y_2}{x+y_2}$$

It can be seen that $$C_1 = C_3 \left(\frac{y_1}{x+y_1}\right)\left(\frac{y_2}{x+y_2}\right)$$

and in the general case:

$$C_m = C_{n+1} \left[\frac{(y_m)}{x+y_m} \frac{(y_m+1)}{x+y_{m+1}} \cdots \frac{(y_n)}{x+y_n}\right]$$

where $C_{n+1}$ is the value of $C_m$ in zone $(n+1)$.
If $y_1 = y_2 = y_3 = y_m = y_{m+1} = \cdots y_n = y$ $$C_m = C_{n+1} \left(\frac{y}{x+y}\right)^m$$

Figure 2:
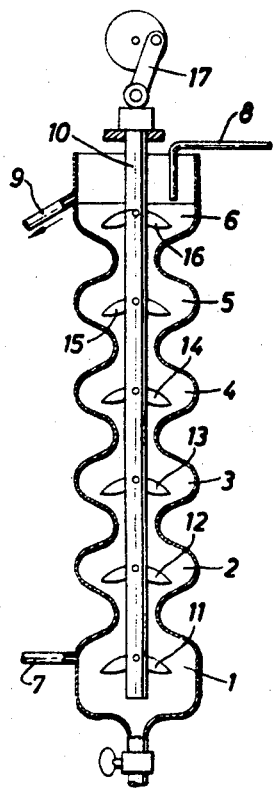

In FIGURE 2 a series of interconnected chambers 1–6 is ranged vertically and forms the zones. Chamber 1 has a side arm 7 for introduction of feed liquid. Chamber 6 has an inlet tube 8 for introduction of precipitant liquid and an outlet 9 for precipitated slurry and liquid. A rod 10 extends from chamber 6 to chamber 1 and clearance is maintained between it and the walls forming the chambers to allow passage of liquid from one zone to another. Rod 10 is provided with paddle blades 11 to 16 which provide a good stirring action in the chambers. Rod 10 is mounted so as to rotate about its axis and it is also connected to a link 17 which produces a vertical reciprocation movement of the rod.

Reciprocation of the rod produces reversal of flow periodically of the liquid passing from one chamber to another.

Figure 3:
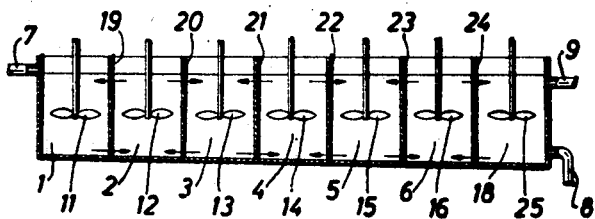
FIGURE 3 shows a horizontal flow line in which liquid transference is achieved by the action of rotating propellers and the zones are defined by the walls of chambers.

In FIGURE 3 seven chambers are provided, these being numbered 1 to 6 and 18. Partitions 19 to 24 contain upper and lower orifices to allow passages of liquid from one chamber to another. Feed liquid enters through tube 7, precipitant liquid enters through tube 8 and mixed slurry and liquid is removed via tube 9. Propellers 11 to 16 and 25 are set so that the liquid in chambers 1, 3, 5 and 18 are driven downwards and the liquid in chambers 2, 4 and 6 is driven upwards. The direction of movement of liquid is indicated by the arrows.

Figure 4:
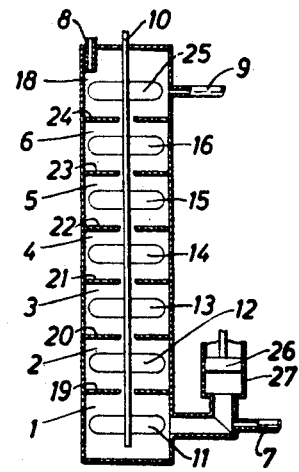
FIGURE 4 shows a vertical flow line in which liquid transference is achieved by a piston which reciprocates in an arm to one feed line, and the zones are defined by the walls of chambers.

In FIGURE 4 chambers 1 to 6 and 18 have partitions 19 to 24 with central apertures through which a rod 10 can pass. Rod 10 is provided with paddle blades 11 to 16 and 25 and rotates about its axis. A piston 26 is mounted in a side-on 27 of tube 7. Reciprocation of piston 26 produces periodic reversal of flow from one chamber to another.

In FIGURE 5 zones 1 to 6, 18 and 28 are separated by discs 19 to 24 and 29. Each disc is pierced and scoops 29 to 42 are provided to transfer liquid from one zone to the next when rod 10 is rotated.

In FIGURE 6 zones 1 to 6, 18, 29 and 43 and 44 are separated by discs 19 to 24, 29, 45 and 46 mounted on a rod 10 of relatively large diameter compared with the diameter of the discs. Piston 26 provides movement of precipitant solution in the direction against the flow of the liquid. The dimensions of the zone are chosen so that toroidal flow occurs within each zone, any particle within each zone moving in a spiral around the rod 10 as the rod rotates.

In FIGURE 7 chambers 1 to 6 and 18 have partitions 19 to 24 with central apertures through which rod 10 can pass. Rod 10 is provided with discs 11 to 16 and 25 having small holes 29 to 42 therein, and is mounted to reciprocate along its axis.

As has been already stated, the zones need not be clearly delimited by any physical barrier. Thus in one embodiment a rotor having a number of short stub arms rotates in a tube of diameter bigger than the total diameter of the rotor and arms. The arms produce vortices which travel away from the arms in both directions and produce the desired transference of fluid medium.

Coming now to FIGURE 8, it is necessary first of all to consider physio-chemical theory.

The growth of crystals in a super-saturated solution is dependant upon two processes, diffusion to the surface of the crystal, and reaction at the surface to give an ordered crystal structure. On this basis the rate of growth is given by the formula:

$$\frac{dm}{dt} = \frac{a}{\frac{1}{K_r} + \frac{1}{K_d}} (C_B - C_O)$$

where $dm/dt$ is the mass rate of growth of the crystal
$a$ the area of the surface
$K_r$ the surface reaction constant
$K_d$ the diffusional process constant
$C_B$ the solubility in super-saturated solution
$C_O$ the normal solubility.

A more convenient form of this is as follows:

$$\frac{dM}{dt} = \frac{A}{\frac{1}{K_r} + \frac{1}{K_d}} (C_B - C_O)$$

where $dM/dt$ = total deposition per unit volume of the medium
$A$ = total surface area per unit volume of solids suspended in the medium.

$dM$, $K_r$ and $K_d$ may be regarded as constant in a given precipitator operating at a fixed throughput. $A$ is thus proportional to $$\frac{1}{C_B - C_O}$$

In a precipitator in which nucleation is occurring $C_B$ will be fixed at the value at which nucleation commences, and it can be shown that under these conditions $C_B - C_O$ is proportional to the solubility $C_O$, and both can be varied by varying the ionic composition of the solution (the common ion effect).

In the case of a non-buffered reaction, e.g.

$$Ba^{++} + SO_4^{--} \rightarrow BaSO_4$$

solubility will be greatest when the ions are present in equal amounts.

Excess of either ion will depress the solubility. Thus if the reaction occurs continuously in a stirred vessel precipitator the coarsest, most readily filterable precipitate, with the lowest surface area will be obtained with stoichiometric flow rates of the two reagents. Excess of either feed solution will produce a finer precipitate, but the unprecipitated material remaining in the mother liquor will also be less. Where a moderately soluble compound is being precipitated in a single stage unit a compromise between solubility and ease of filtration is necessary.

In a buffered system, e.g. $Fe^{+++} + 3OH^- \rightarrow Fe(OH)_3$, the OH ion concentration may be controlled over a very wide range by the conventional methods of pH control, the solubility of the metal can therefore be varied over a wide range (for reaction purposes the OH ion is derived from water by the reaction $H_2O \rightleftharpoons OH^- + H^+$). Thus as the pH of continuous precipitation is lowered the solubility will increase and a coarse precipitate obtained.

Looking now at FIGURE 8. Curves 1 and 2 in the lower graph, give settled volumes obtained by continuous single stage precipitation at certain pH values. The settled volume is given by the lower vertical scale and the pH is given by the abscissae. Curve 1 was obtained by feeding gaseous ammonia into acidic uranyl nitrate solutions, and curve 2 was obtained by feeding 880 ammonia solution into a similar solution.

The upper vertical scale is a logarithmic scale showing concentration. Dotted line 3 is the concentration of uranyl nitrate in the solutions treated as above. The line $C_O$ shows the normal solubility values of ammonium di-uranate at the pH values shown, and the line $C_B$ shows the solubilities at the pH values shown, in supersaturated solutions in which the rate of nucleation becomes very rapid.

The upper limits to $C_O$ and $C_B$ are of course determined by the actual quantities of materials present. The maximum values of $C_O$ and $C_B$ thus cannot rise above line 3.

$C_O$ has been discontinued arbitrarily at its lower extremity in the drawing but it clearly can be projected downwards.

Values of $C_B - C_O$ are plotted as the curve $(C_B - C_O)$. The similarity between the shape of the $C_B - C_O$ curve and the settled volume of precipitated ammonium di-uranate (curves 1 and 2) is apparent.

It is also apparent that by using a more concentrated feed solution and precipitant the upper limit to $C_B - C_O$ can be raised and a better precipitate obtained. This is demonstrated by the use of gaseous and aqueous ammonia precipitation. In the former case the liquor is less diluted than in the latter and a better precipitate (smaller settled volume, equivalent to faster settling and easier filtration) is obtained. To obtain optimum results the feed material and precipitant should thus be as concentrated as possible.

Since most of the crystal growth occurs in the region of the optimum pH the size of the stage or stages in this region should be as large as convenient compared with the later stages.

In an example of the invention the fluid medium was water, the feed material was an aqueous solution of 0.6 M uranyl nitrate 2 N with respect to $HNO_3$, and the precipitant material was strong ammonia solution. A unit was set up as in FIGURE 2 and the rates of flow of feed and precipitant materials adjusted so that the zone 1 was held at pH 3.5 and zone 6 was held at pH 9, the intermediate zones having intermediate values in the range.

The precipitate of ammonium di-uranate produced was coarsely crystalline and settled at more than 5 cm. per minute. The amount of uranium in the waste liquor was less than 2 mg. per litre.

In contrast with this, when the precipitation was carried out with the same feedstock materials in a well stirred tank the combination of good settling rate and low content of uranium in the waste liquor could not be achieved.

Thus in one case, where the contents of the tank were held at pH 7.5, the quantity of uranium in the waste liquor was less than 2 mg. per litre but the precipitate was finely divided and settled at only 0.0014 cm./minute.

In another case, where the contents of the tank were held at pH 3 to pH 4, the precipitate was coarsely crystalline and settled at 5 cm./min. but the waste liquor contained up to 10,000 mg. of uranium per litre.

I claim:
1. A multistage precipitation process which comprises feeding an excess of a precipitant material into a moving fluid stream consisting initially of a feed material dispersed in a fluid medium, the said precipitant material being miscible with the said fluid medium, and the said feed material being present in a form in which it is not physically separable from the fluid medium, sweeping the precipitant material along in the said stream and simultaneously dispersing it therein to form a fluid mix in which the feed material is converted into a precipitate which is physically separable from the fluid medium, simultaneously transferring a proportion of the said fluid mix in each of a plurality of consecutive interconnected mixing stages to a point up stream of the said transferred proportion of the mix, dispersing the said mix in the said moving stream, and sweeping the dispersed mix along in the said stream.

2. A process as claimed in claim 1 in which the said transference is achieved by periodical reversal of the direction of flow of the fluid medium.

3. A process as claimed in claim 1 in which the feed material is fed into the lower end of an upwardly inclined conduit, the precipitant material is fed into the upper end of the said conduit, and fluid mix is withdrawn from the said upper end.

4. A process as claimed in claim 3 in which a stirrer is rotated in the conduit and simultaneously reciprocated up and down in the conduit to achieve the said transference.

5. A process as claimed in claim 3 in which the feed material is fed into the conduit in a series of consecutive spurts and direction of flow of the feed material is reversed between the said spurts to provide a periodic reversal of the direction of flow of the fluid stream in the said conduit.

6. A process as claimed in claim 1 in which the fluid medium is water.

7. A process as claimed in claim 1 in which the feed material comprises an inorganic salt soluble in the fluid medium.

8. A process as claimed in claim 7 in which the inorganic salt is uranyl nitrate.

9. A process as claimed in claim 1 in which the precipitant material is an inorganic material soluble in the fluid medium.

10. A process as claimed in claim 9 in which the precipitant material is ammonia and the fluid medium is water.

11. A process as claimed in claim 1 in which the feed material is an organic material dissolved in the fluid medium, and the precipitant material is adapted to lower the solvent power of the fluid medium for the said organic material.

References Cited

UNITED STATES PATENTS 2,747,973    4/1956    Hinrichs _____ 23—270.5 X

CARL D. QUARFORTH, *Primary Examiner.*

L. DEWAYNE RUTLEDGE, *Examiner.*

S. TRAUB, R. L. GRUDZIECKI, *Assistant Examiners.*

UNITED STATES PATENT OFFICE
CERTIFICATE OF CORRECTION

Patent No. 3,393,055                                            July 16, 1968

David Gordon Stevenson

It is certified that error appears in the above identified patent and that said Letters Patent are hereby corrected as shown below:

Column 7, lines 21 and 22, cancel "transferred por- portion of the"; line 22, after "said", first occurrence, insert -- transferred portion of the --.

Signed and sealed this 17th day of March 1970.

(SEAL)
Attest:

Edward M. Fletcher, Jr.                          WILLIAM E. SCHUYLER, JR.
Attesting Officer                                             Commissioner of Patents